Sept. 4, 1928.

H. R. BRAND

METHOD OF COMMODITY CONTROL

Filed March 20, 1919   10 Sheets-Sheet 1

1,682,827

Inventor
H. Russell Brand.
By E. H. Bond
Atty.

Sept. 4, 1928.

H. R. BRAND

METHOD OF COMMODITY CONTROL

Filed March 20, 1919    10 Sheets-Sheet 3

Inventor,
H. R. Brand,
By
E. H. Bond
Atty.

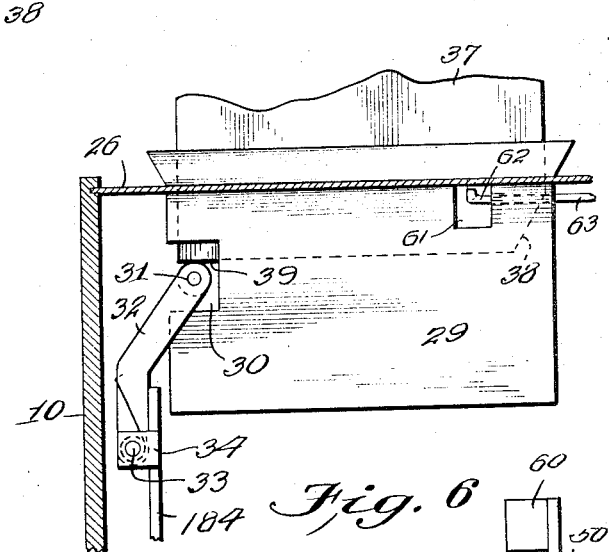
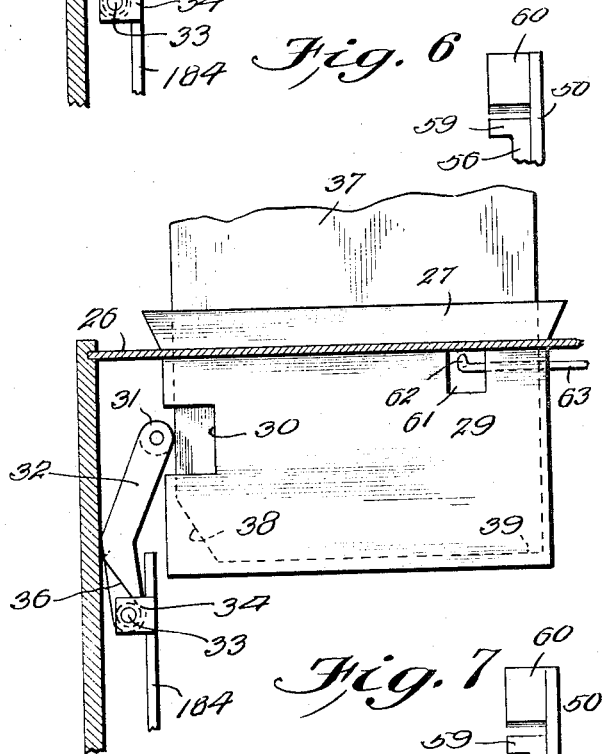

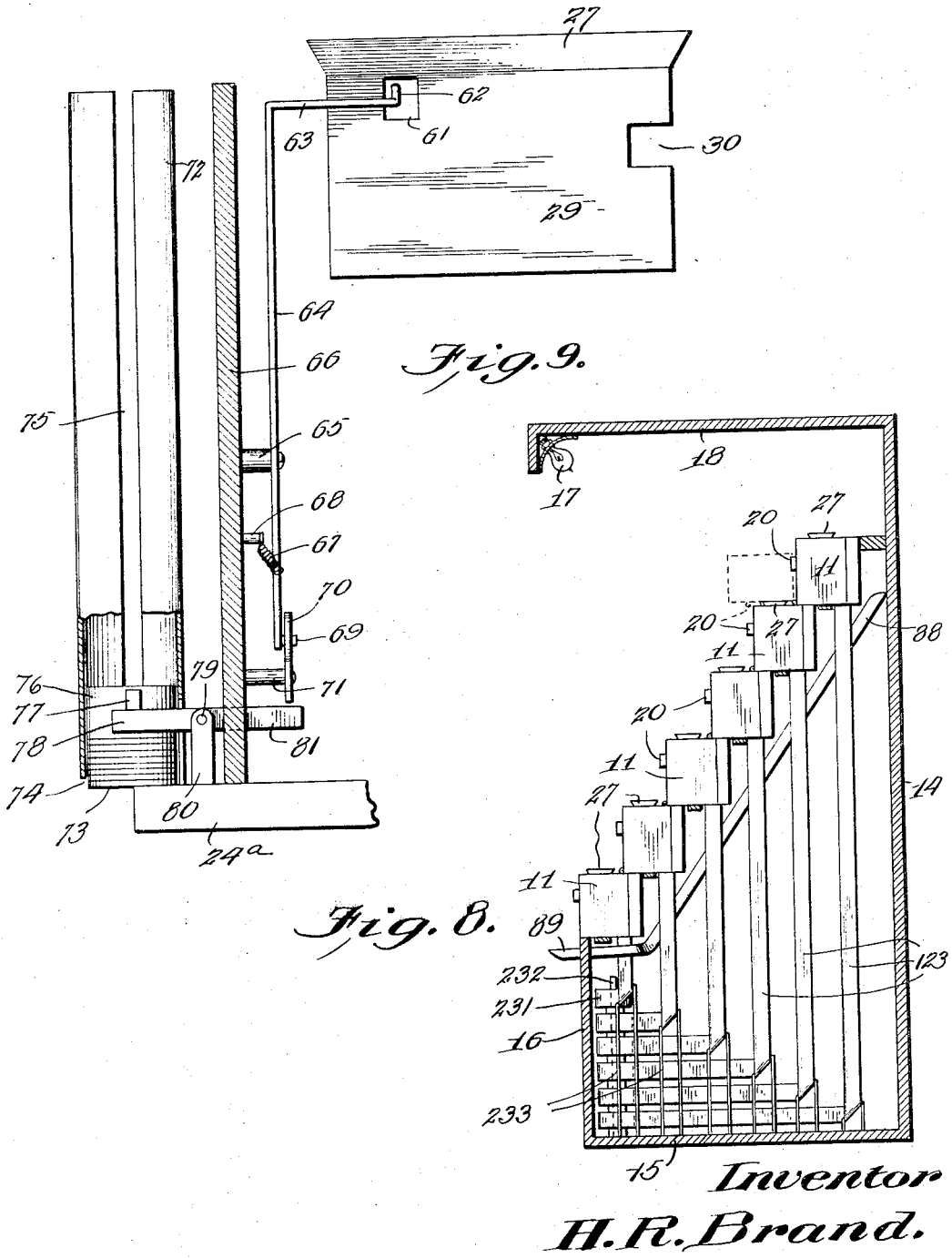

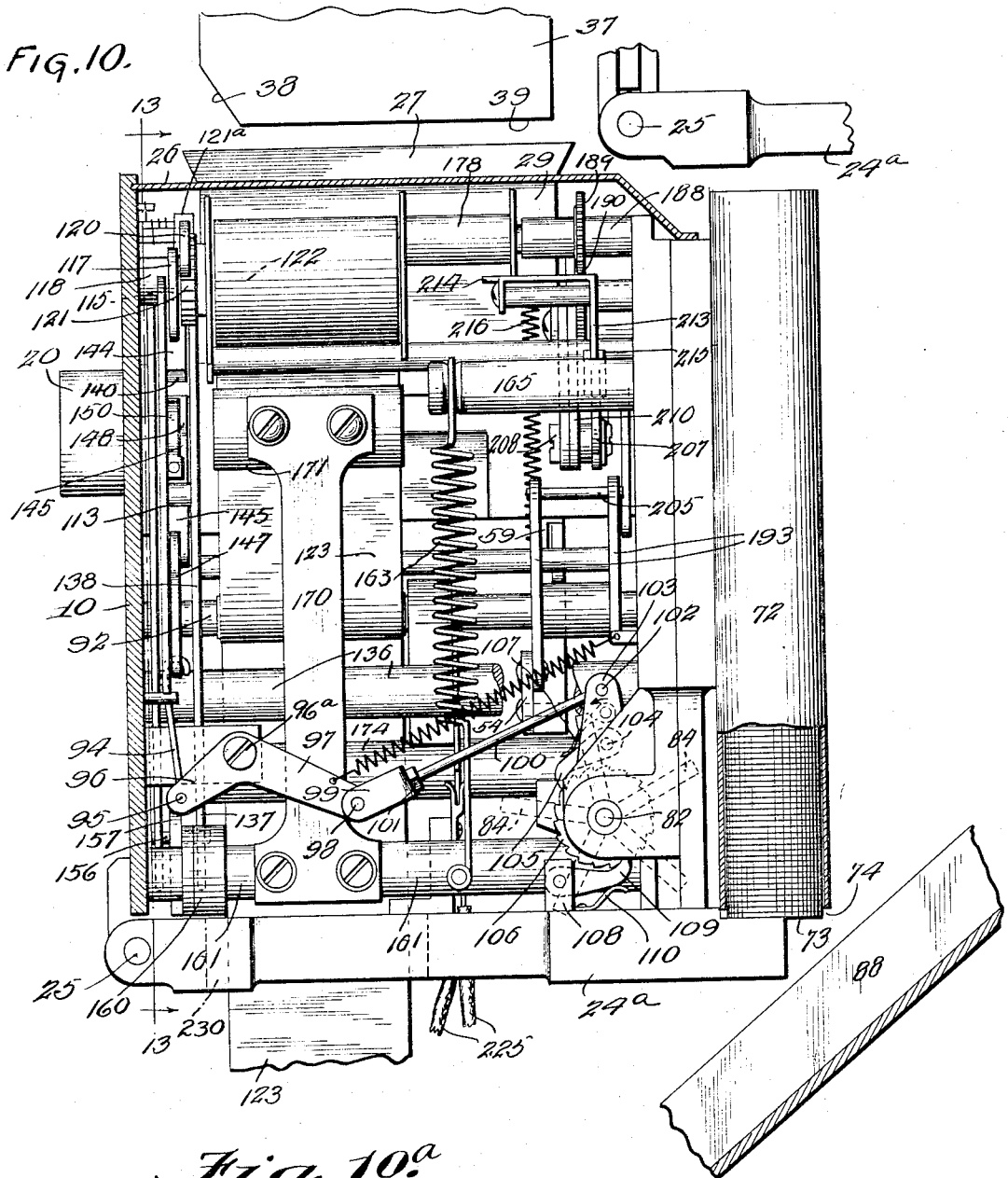

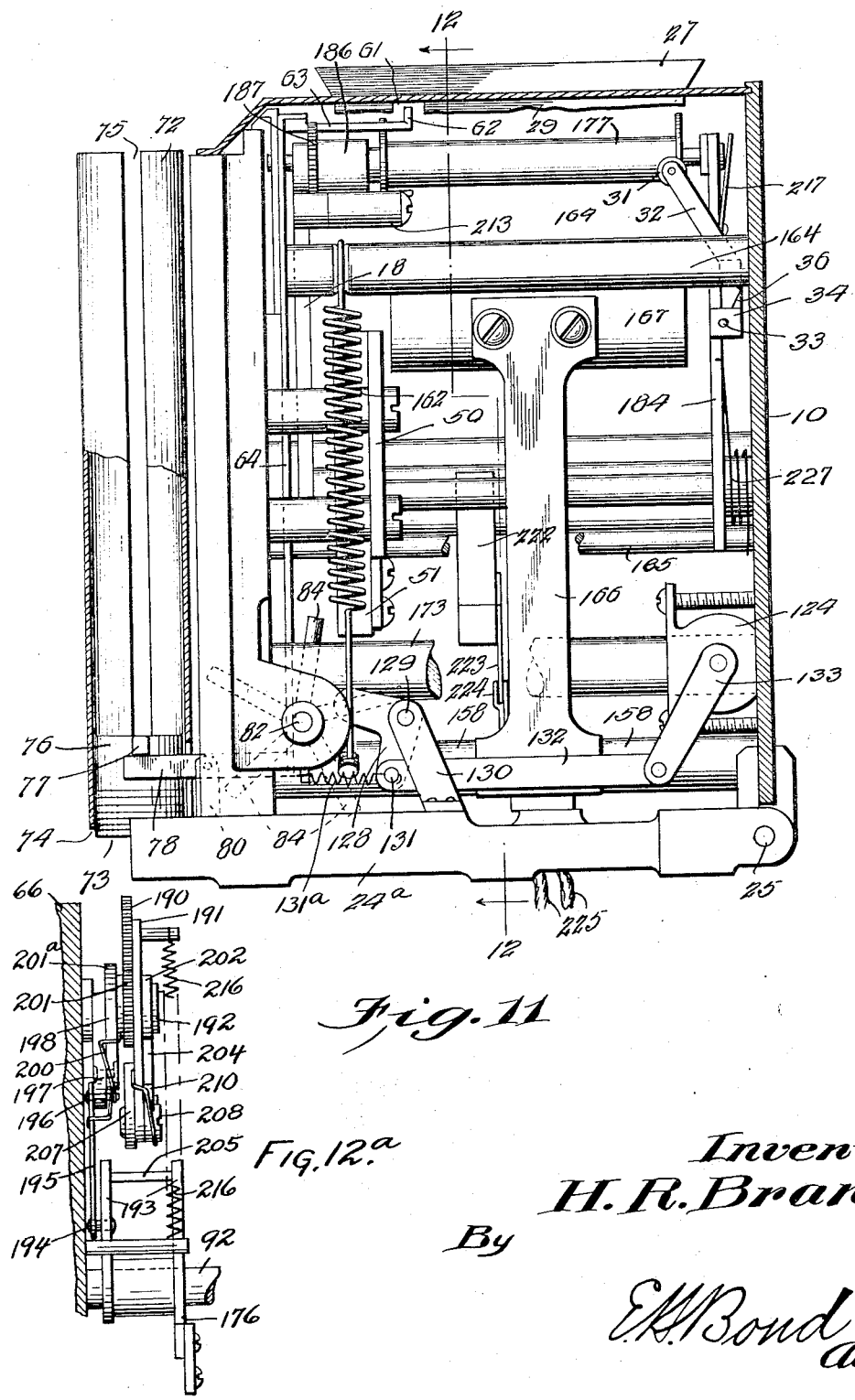

Sept. 4, 1928.                                                          1,682,827
H. R. BRAND
METHOD OF COMMODITY CONTROL
Filed March 20, 1919          10 Sheets-Sheet 8

Inventor
H. R. Brand
By
E. H. Bond
Atty.

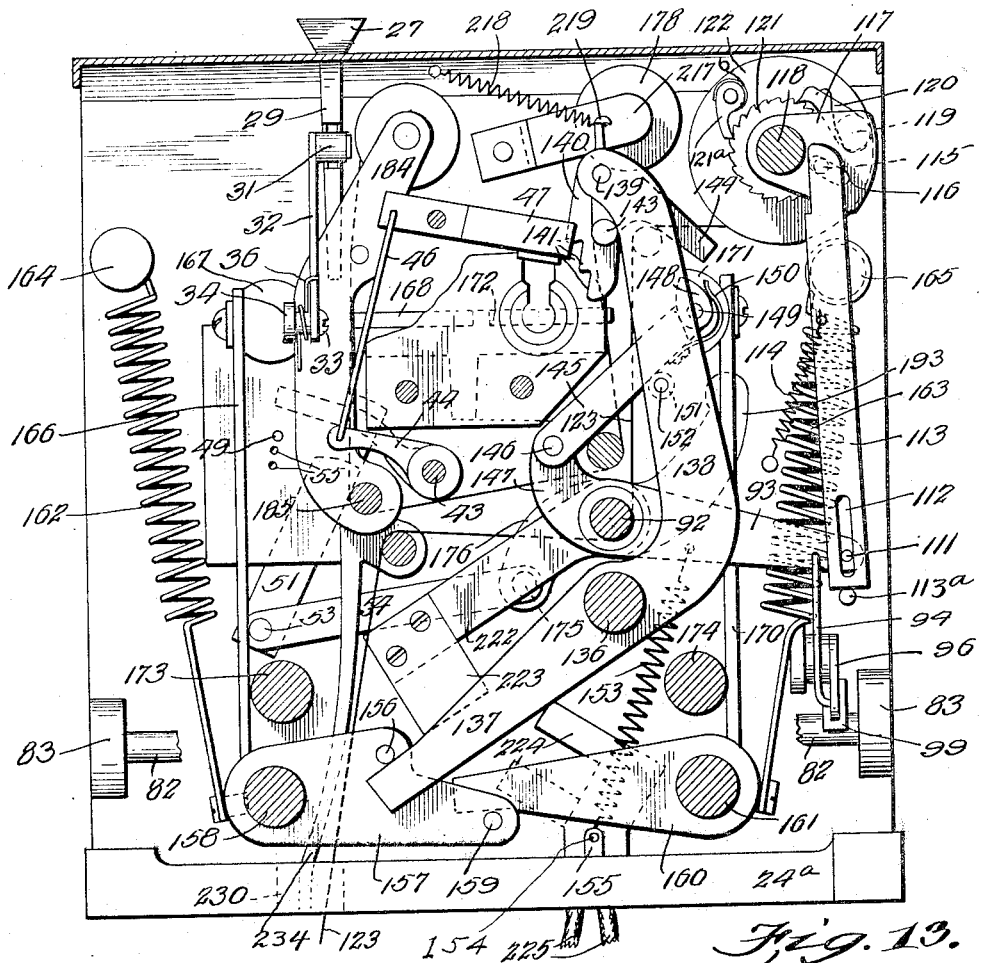
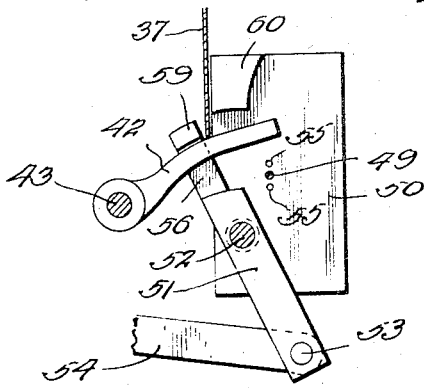
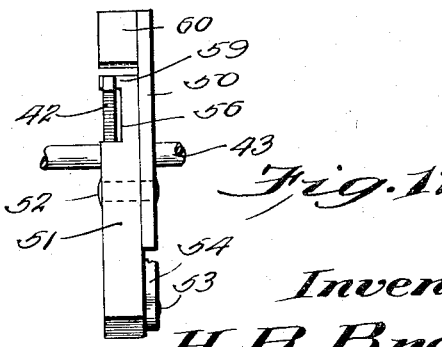

Inventor
H. R. Brand,
By
E. H. Bond
Atty

Patented Sept. 4, 1928.

UNITED STATES PATENT OFFICE.

HARRY RUSSELL BRAND, OF NEW YORK, N. Y.

METHOD OF COMMODITY CONTROL.

Application filed March 20, 1919. Serial No. 283,817.

This invention relates to commodity or food control, and while more particularly designed for use in hotels, restaurants and the like, it is to be understood that the same is not restricted to such uses, but may be employed for other purposes for which it is adaptable.

The present invention has for its objects, among others, to provide a food or commodity control that will automatically insure more capacity, greater speed, better service, accuracy, eliminate graft of food by and between the cooks, servers, checkers, cashier and guests, and also enable the management to have placed before them in a short time after the close of the day's business, an accurate tabulated statement of the day's sales, or commodities sold, waiter's sales, department sales, and all other data that is required in connection with the operation and control of the business.

I provide for the automatic accomplishment of the following results. By the mere placing of the food check or card in the hereinafter described device and a turn of a key, the ordered food portion is printed in the proper place on the food check or card, the proper price is thereon recorded in the price column of said food check or card, the waiter is charged for the value thereof on the inside of the device, where there can be no tampering with the card, price or item, the waiter is given an order on the server to prove to the server that he has been authorized to collect the food portion, the cook or server is notified by an annunciator or the like to prepare the food portion. (thus saving several minutes time by the waiter not having to go to the kitchen), and the number of each food portion sold is tabulated ready to be copied by the auditor. and these are all automatically accomplished in the one device in less time than it takes an ordinary waiter to write out a food check or card by hand which later is required to be priced, price checked and audited.

The checking systems commonly used in connection with food control in hotels and the like, particularly the duplicating checking sytems, cause much delay in service, in addition to extra work by the checker, cashier and auditor. As a general rule, the waiter is a poor writer, and, furthermore, has great difficulty in writing and handling duplicate sheets generally used in connection with the food check or card (which is written upon a paper on a sheet holder or book and employing a carbon sheet), as a separate duplicate for each individual item on the food check or card must be written. In addition to this, the duplicate must necessarily be collected and read by the cook and server who, as a rule, are inefficient readers, if not altogether unable to read poor hand-writing. As my device prints the food check or card from type upon being operated upon by the latter, there can be no difficulty in reading it and there is no liability of inability to read it as often happens when the waiter attempts to rub out an erroneous writing, making a blur. As the device also delivers to the waiter an order on the cook upon which is identified the portion desired, by a printed name or number thereon, there can be no doubt of the server or cook being able to readily read and identify it. Therefore, the difficulty in respect to the writing and reading is eliminated.

A further improvement of my invention over the present systems is the elimination of graft. This is accomplished by the waiter having made an automatic record charging both himself and the server with the commodity and the value thereof before any preparing, checking or serving transaction has taken place. My device having thus automatically charged the sale price necessitates the cashier turning in the same value in sales.

The number of commodities having been recorded on the inside of the device necessitates the server having to produce the same number of orders or tokens collected from the waiter. This number necessarily having to check up with the amounts of the same commodities issued to the server by the storekeeper or controller, these facts become the evidence by which to locate immediately any shortage in money or commodities from whatever source such shortage may occur.

A further improvement of my present invention over the prior systems of food or commodity control resides in the food checking. A food checker is not only supposed to check the food passing out of the kitchen, but also to price it. It is evident that there is no check on the server, the waiter can take food stuff past the checker provided the waiter is working in collusion with the checker. A checker can, if desired, let a waiter pass with food that is not designated on the food check or card; he can also allow the waiter to give food stuff to an employee. Collusion between employee and the checker is a common thing in all hotels and restaurants due to the very fact that no system yet devised can stop it without requiring an enormous amount of red tape and actually slowing up the service, which latter should be avoided. With my invention in use there can be no collusion between employees as the checker is not needed for food pricing, that labor being saved, as well as the time required therefor, the pricing already having been done by the automatic device, which cannot be tampered with by anyone.

A further improvement of my invention over the prior systems of control is the auditing. A hotel or restaurant auditor must necessarily do the following things to produce statistics in accordance with the demands of that industry. He must add up the sales. He must separate the waiter's food checks or cards in order to determine waiter's sales. He must arrange each waiter's checks in their serial numbers to determine if any checks are missing. He must, if any are missing, look up the duplicate at the checker's desk and see if these checks were collected for by the waiter. He must take off each individual line item on the food checks or cards to make up what is commonly known as a food portion sheet, so as to determine what the sales were on each food commodity, and then build up his percentage figures of profit between cost and sales. All these operations are laborious and slow, notwithstanding the fact that the management should have the statistics as quickly as possible after the day's work is done. The auditor is further handicapped by the fact that accuracy is almost impossible because it becomes necessary for him to read the writing of the waiters to make up the food portion sheet.

All this work is eliminated by my device. There is no need of serial numbers on the checks or cards as there can be no lost checks or cards. There is no need of collating food checks or waiter's sales, as the machine has charged the waiter. There is no need for analyzing the food checks to make up the food portion sheet, as the machine adds up the orders in each separate commodity as they are made. Therefore, it is evident that practically all of the auditing work will be saved and much time will be saved besides getting the statistics before the management in a short time after the last sale is made.

Another improvement effected by the adoption of my invention will be quick service. There is no delay from the time the waiter takes the order of the guest until he is served. In waiting on a guest under the systems commonly used, the waiter must first go to the kitchen after getting his order from the guest and place the order with the cook and server. Then to save time he must go back to the dining-room and do the work of preparing his service, while he is waiting for his order to be prepared in the kitchen. After finally collecting his order in the kitchen on his second trip in, he then must pass by the checker's desk and have his tray of food portions examined and compared with his food check, that must then be priced, and then he is ready to serve the guest. By my improvement much of this time is saved. There is one device for each food commodity, located at any desired place, and there being as many of these devices as the capacity and other conditions about the hotel or restaurant may demand. They may be arranged as most convenient and such device is separate and complete in itself. They generally will be arranged as close to the dining-room as possible, and as soon as the waiter gets his order from the customer verbally, in the usual way he goes up to the appropriate device and drops his food check or card into the said device which will be that which he needs to use in order to have his check written and priced. He may then proceed with his service without going to the kitchen and upon getting his food stuff and passing the checker, where he does not have to stop to have it priced, as it has already been priced by the device. This insures that the customer will be served with his food more promptly than before.

In addition to the above, my present improvement embodies a checking system that makes it necessary for the server to show a receipt for the food delivered to the waiter, the waiter must leave a record of what he orders from the cook; the checker having nothing to do with the pricing of the food as it passes him to the dining room, serves merely in the capacity of food inspector.

My present improvement makes collusion between the checker and the waiter impossible.

It makes collusion between the cook and the waiter impossible.

It makes impossible collusion between the cashier and the waiter.

It renders impossible collusion between the waiter and the guest.

It makes impossible collusion between the waiter and any employee.

It makes wrong pricing impossible.

It insures a positive check on each food commodity so that a shortage of any commodity can be instantly traced to its source. It shows the amount or quantity of food consumed by the server; the amount served to the waiter or employee; the amount delivered or sold on food checks. If all three of these agree, then it is proof that there have been no losses through theft, graft, collusion or other leakage.

It provides a printed check instead of one that is hand-written, thus obviating chance of error through poor handwriting.

All of the above, and more too, is automatically accomplished without slowing up the service, but, on the other hand, greatly facilitating the same, and placing less work upon all the parties concerned.

Furthermore, the device is "fool-proof". There is no possibility of error. The check or card cannot be placed in the machine in the wrong position. There is no possibility of getting the wrong price on any card, nor is it possible for one waiter to get his card mixed up with that of another.

To summarize: the waiter places his food check or card in the machine; it drops to the proper place, if properly inserted; if not, then it cannot drop to operative position and must be taken out and properly inserted. The card, when in proper position, cannot receive the printing except in the predetermined way and in the prescribed position. The waiter inserts his key, which bears his number, into the key-hole and turns it, which causes his number to be printed on the paper strip, which, with a carbon sheet or strip, is automatically fed forward, the inked ribbon serving for use with the strip of paper and with the inserted card. The turning of the key releases mechanism which serves to print upon the card the name and price of the food commodity, which that particular machine indicates, and upon the said paper strip the number of the machine (each machine will bear its own distinguishing number) in addition to the number of the waiter, as above indicated. The turning of the key also releases mechanism which serves to push out or otherwise eject a check or token bearing the number of the commodity wanted in the kitchen. At the same time, means are thrown into operation which by means of an annunciator or the like in the kitchen notifies the cook that this waiter is coming after the food commodity corresponding to that indicated by the particular machine that has been operated by the insertion of the key.

Each waiter has his own key, properly numbered, and this key capable of operating each and every box, but each time a waiter operates one of the devices his number will be imprinted upon the strip by the act of turning the key. The key cannot be turned until the card is inserted in the machine and is in the proper position. The printing cannot be done until the key is actuated.

The totals of the amounts on the cards can be added by the waiters or the cashier, or, on a totalizer. The audit strips may be caused to emerge from the machine in any well known way, and wound upon rolls if desired.

Various accessories are provided, or may be provided, whereby the improvement may be carried to further extent, to perform functions other than those above outlined.

Other objects and advantages of the invention will hereinafter appear and the novel features thereof will be specifically defined by the appended claims.

The invention, in its preferred forms, is clearly illustrated in the accompanying drawings, which, with the numerals of reference marked thereon, form a part of this specification, and in which—

Figure 5 is an enlarged elevation of one of the waiter's cards or checks, after it has been printed upon by five insertions.

Figure 6 is an enlarged detail, partly in elevation and partly in section, showing the conditions when a card or check is presented in improper relation.

Figure 7 is a similar view, showing the operation when the card or check is properly presented.

Figure 8 is an end view of the tier of units shown in Figure 1, with the end wall removed, to better illustrate interior parts.

Figure 9 is an enlarged detail of the means for closing the card-entrance to the unit at predetermined time.

Figure 10 is an end view, of one of the units with the end wall removed and parts in section, with portions broken away.

Figure 10$^a$ is a detail of a portion of the audit strip.

Figure 11 is a view looking at the opposite end of the unit, with parts in section and portions broken away.

Figure 12:
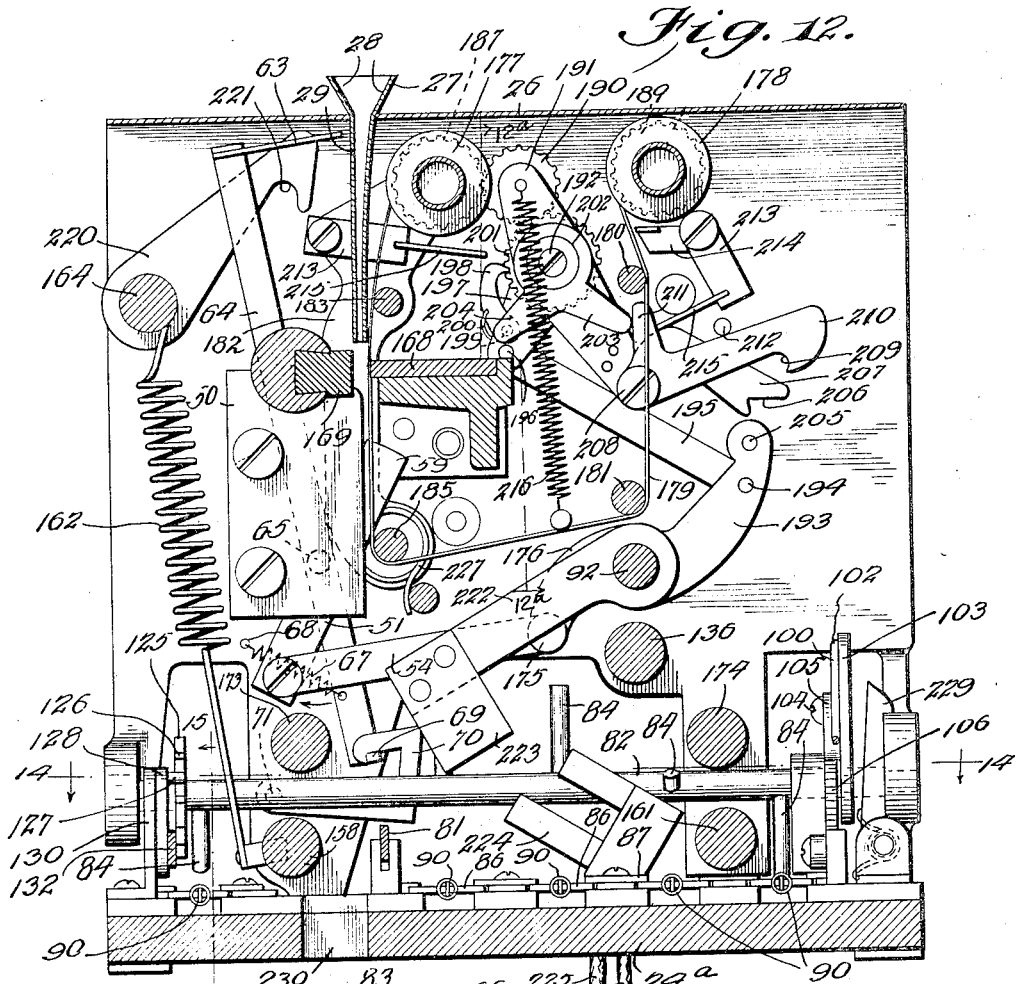

Figure 12 is a vertical transverse section as on the line 12—12 of Figure 11.

Fig. 12$^a$ is a fragmentary section on line 12$^a$—12$^a$ of Fig. 12;

Figure 13 is a vertical transverse section, as on the line 13—13 of Figure 10.

Figure 14:
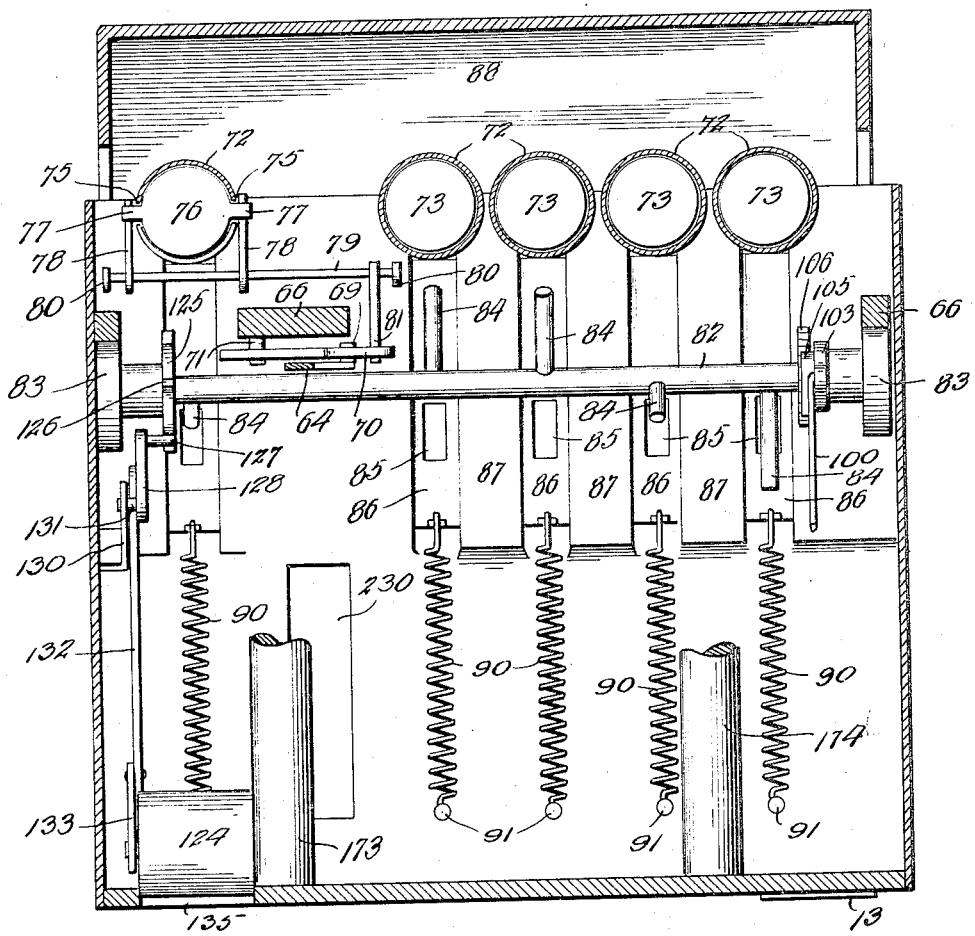

Figure 14 is a horizontal section as on the line 14—14 of Figure 12, looking down.

Figure 15:
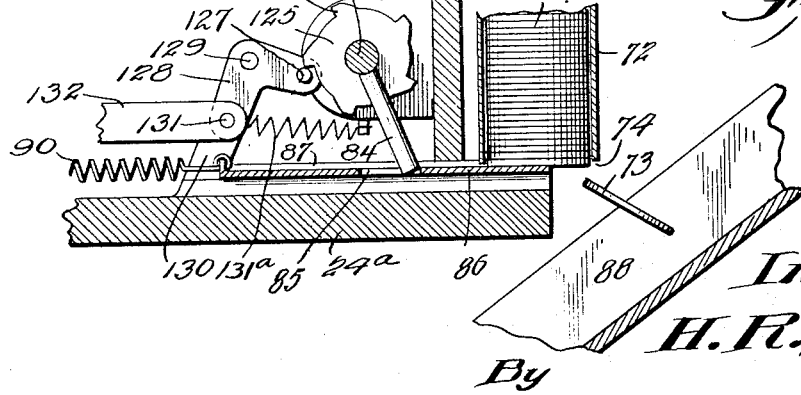

Figure 15 is a vertical section as on the line 15—15 of Figure 12.

Figure 16 is an elevation of the movable knife and the arm that cooperates therewith.

Figure 17 is an edge view of the parts shown in Figure 16.

Figure 18:
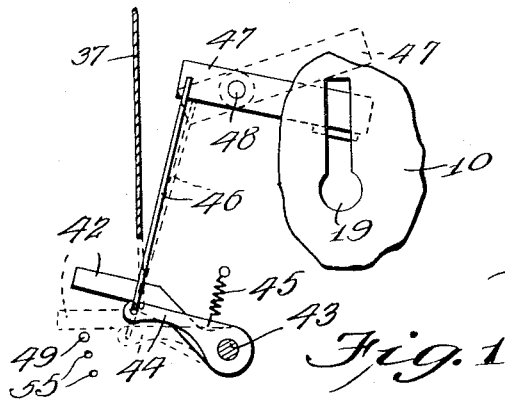

Figure 18 is an enlarged detail of the key-hole guard and its associated parts.

Like numerals of reference indicate like parts throughout the several views.

In carrying out my invention, I employ a multiplicity of units, each complete in itself, said units being arranged in tiers, or otherwise, so as to be convenient of access, the number of units employed depending upon the magnitude of the business, or other conditions or circumstances. While for the purposes of illustration and demonstration of the practicability of the invention, I have shown the same as applied to the control of food in a hotel or the like, it is to be understood that the invention is not restricted in its use for this purpose, but may be employed in connection with other commodities than food.

Figure 2:
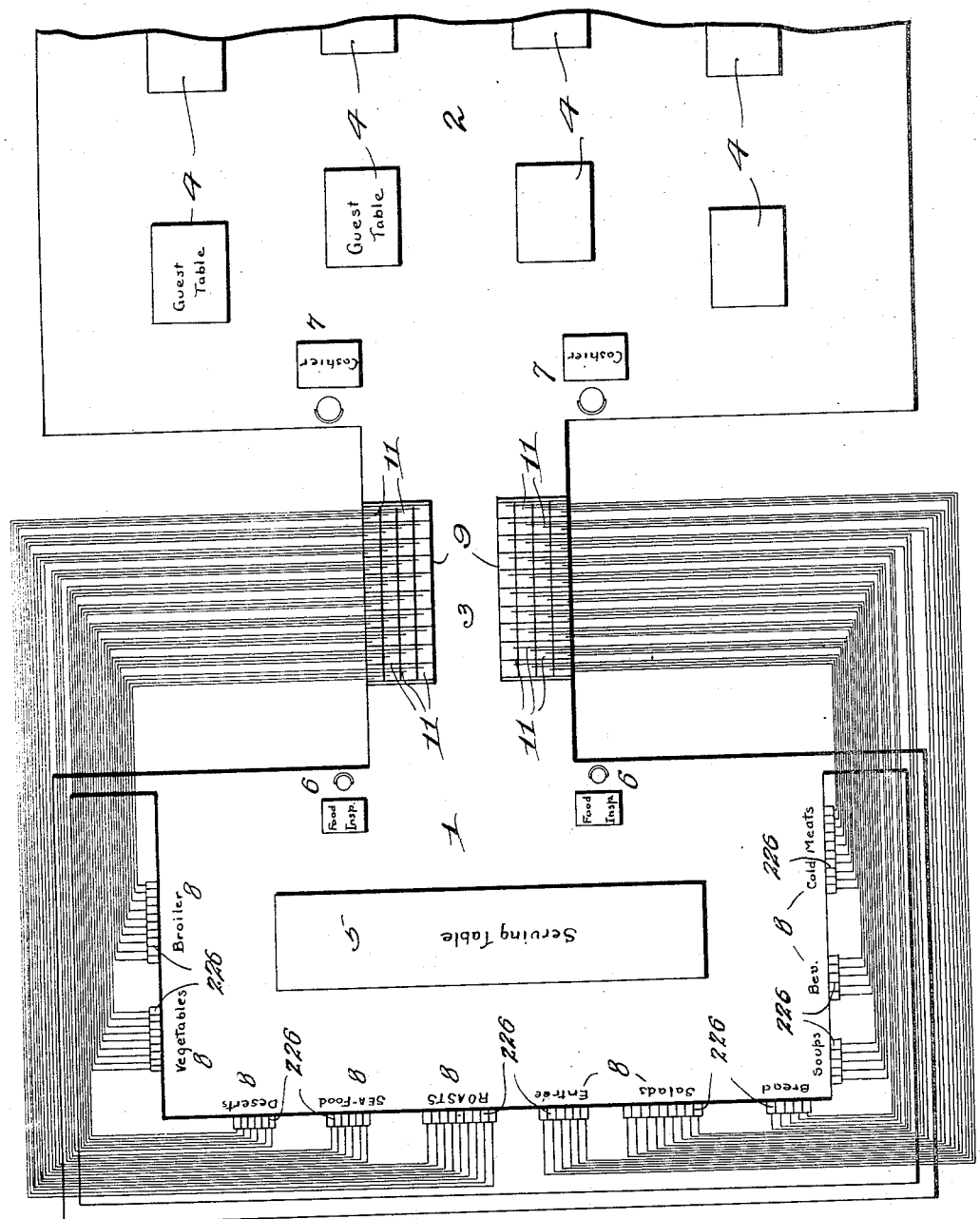
Figure 2 is a diagrammatic view of a kitchen and portion of a dining-room of a hotel, with two tiers of my devices arranged one upon either side of the passage from the kitchen to the dining-room.

Figure 2 shows diagrammatically the application of my present invention. In this view 1 represents the kitchen, 2 the dining-room, 3 the passageway between the kitchen and dining-room, 4 the guest tables, 5 the serving table proper, 6 the food inspectors' tables or desks, and 7 the cashiers' desks. In the present instance I have shown two food inspectors' and two cashiers' desks, one upon each side of the passageway 3, but the number of food inspectors and cashiers may be varied as occasion may require. Under my improvement the services of a checker are dispensed with.

The various tables in the kitchen where the different commodities are prepared are indicated in Figure 2 at 8; some of the different commodities prepared at such tables or stations are designated upon the drawing, Figure 2.

9 are the tiers of units, in the present instance there being shown two sets, one upon each side of the passageway 3. They may be increased or diminished as may be desired or as may be deemed best under the varying conditions or places in which my system may be installed.

Figure 3:
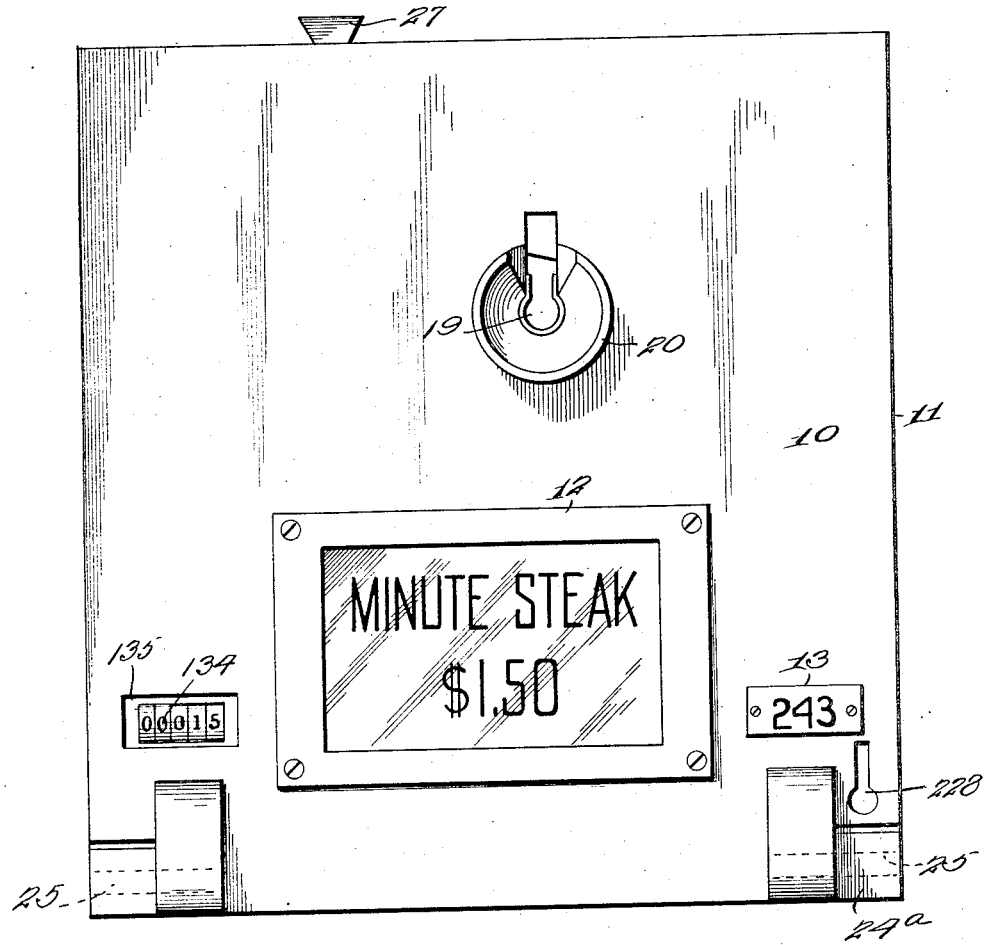
Figure 3 is an enlarged face view of one of the units.

As these units are all alike, a detailed description of one will suffice for all. The only difference between the units is what may be called the "name-plate" on the face thereof, its distinguishing number, also displayed on its face, and the slug or type which does the printing on the card or check, each unit being in this particular individual to itself. For instance, as seen in Figure 3, the front member 10 of the unit 11 has secured thereupon the plate 12 bearing the designation "minute steak $1.50", also the plate 13 bearing the number 243 which designates the number of the commodity, being understood that each commodity has its own number. It will be understood that the unit number 13 is used to identify the commodity as well, that is, the number "243", identified by reference number 13 in Fig. 3, also identifies any order for "minute steak", and an accounting or other supervising authority would read from this number on the strip of Fig. 10ᵃ that the order was for "minute steak". Obviously also a plurality of units could have the same identifying number and be used for the same commodity. As will hereinafter appear, each unit has its type for printing on the check or card corresponding with the designation on the plate 12 on the front of said unit. It will be evident that the number of the unit and the designation of the commodity may be otherwise applied to the unit, as, for instance, by painting or stamping the same directly upon the wall of the unit.

Figure 1:
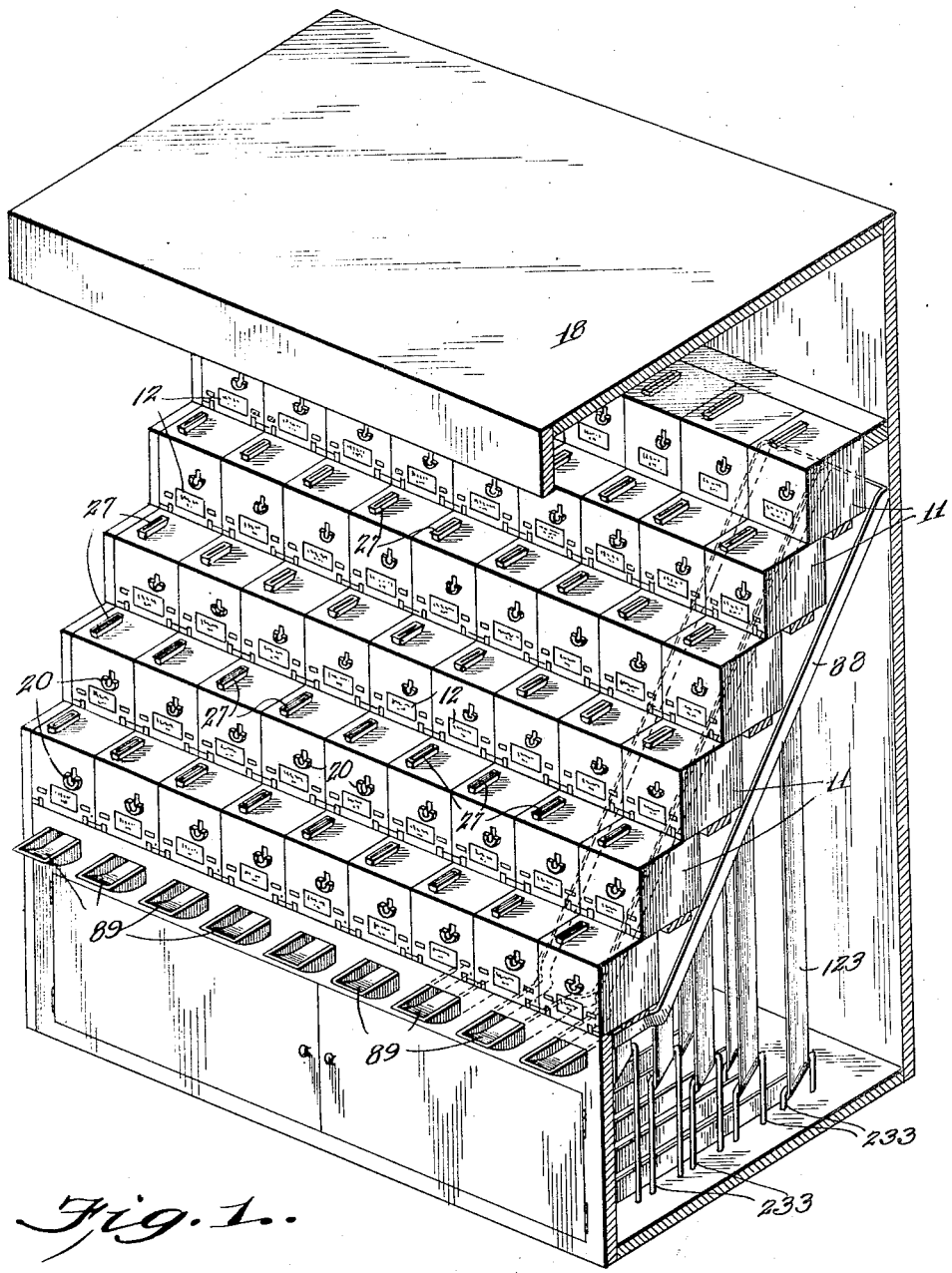
Figure 1 is a perspective view, partly in vertical section from front to rear, showing a collection of units arranged in tiers for carrying out the invention.

Each unit occupies but little space, the units in Figures 1 and 8 being shown as formed in steps which I have found to be the most satisfactory arrangement for economy of space, convenience of access and for general usage. They may be supported in any suitable manner as from the adjoining wall or support 14 and the floor or other base 15, and the front wall 16, as seen in Figure 8, which latter serves to conceal the spools upon which the paper strips are wound. If desired, electric lights, as shown at 17 in Figure 8, may be provided to illuminate the tiers of units, the electric lights being supported in any convenient manner, as by the overhanging member 18, as seen in Figure 8.

The front plate 10 of the unit is provided with a keyhole 19 (Figs. 3 and 13) about which is a projection 20, as seen clearly in Figures 3, 8 and 10. This projection serves to engage the top of the next lower unit in the tier, as indicated by dotted lines in Figure 8 where the upper unit is shown by dotted lines as turned down upon its hinge 21, for access to the interior of the unit for any purpose, such, for instance, as changing the printing characters, renewing the carbons, replenishing the tokens, resetting the counter, removing the audit slip or any other purpose. In operating position or condition, it will be understood that the interior of the units is inaccessible to the waiter or other person operating the unit, so as to preserve the record of transactions, and the supply of tokens inaccessible. This projection 20 also serves as a guide for the insertion of the key.

Figure 4:
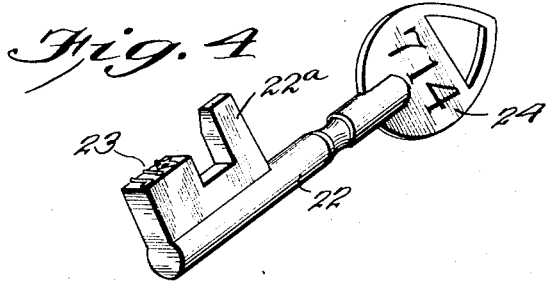
Figure 4 is an enlarged perspective view of one of the keys employed.

The key 22, seen in Figure 4, bears printing characters 23 representing the employee or person operating the unit, which character is printed upon the audit strip by the act of turning the key to release the other mechanisms as is hereinafter described. This key may, if desired, bear the corresponding number, as at 24, so as to readily identify the key, and also has formed thereon a lug 22ᵃ as an actuating member, as hereinafter appears.

The base plate 24ᵃ of the unit receives the pivot 25 of the hinge, as seen in Figures 3 and 10. The details of construction, however, of this hinge are immaterial and form no part of the present invention. As seen in Figures 8 and 10, the units are so disposed that any one may be moved upon its pivot or hinge without interference with the others. The unit is provided with a top member 26 which is designed to be movable in any suitable manner so as to provide access to the interior of the unit, the whole forming, when arranged in the tiers, a casing for inaccessibly containing each mechanism hereinafter described. It will be understood that only those in authority have access to the interior as is later described. The top member 26 supports a member 27, the upper end of which projects through said top member and has its opposite walls 28 inclined, as seen in Figure 12, to serve as a guide for the insertion of the check or card, the said member 27 having a depending guide portion or spout 29 extending down within the unit, as seen clearly in Figure 12.

The depending portion 29 of this guide is provided at one end, in the present instance toward the front plate 10, with a notch 30, as seen clearly in Figures 6 and 7, for cooperation with a projection which may be a roller 31 carried by the upper end of a member 32 pivoted at its lower end, as at 33, upon any suitable support, as, for instance, a lug 34 projecting from the supporting member 184, as seen clearly in Figures 6 and 7. This member 32 is shown as angled in Figures 6 and 7 to economize space and to allow the roller-end to gravitate. In order, however, to aid or assist in causing the member 32 to move into the position in which it is shown in Figure 6, from that shown in Figure 7, I employ a spring 36 under tension, as seen best in Figure 13, coiled around the pivot 33, with one end bearing against the member 32, as seen in Figure 13.

At this point it is thought advisable to describe the card or check employed and the function of the roller 31 in connection therewith. As seen in Figure 5, the check or card 37 has at one end a beveled edge 38. If the card is placed within the mouth portion of the guide with this beveled corner or portion in the relative position shown in Figure 6, the square end 39 of the card will rest upon the roller 31 which, at this time, is disposed within the slot 30 of the depending portion 29 of the card guide, as seen in Figure 6, and the card cannot be further inserted. This makes it absolutely necessary that the card be properly presented or it cannot be passed beyond the point shown in Figure 6. On the other hand, when the card is properly presented, that is, with the beveled portion 38 facing the front wall 10 of the unit, as seen in Figure 7, the incline thereof will act as a wedge, the card being of sufficient rigidity for this purpose, and the card is thus readily forced past the roller 31, and by the inward movement of the card the roller and the arm 32 are forced toward the front of the unit into the position seen in Figure 7, out of the path of the card and the latter can be moved to its proper position. The arm 32 is sensitive in its movement, but when it is in such position that the roller 31 projects into the slot 30, the greater the pressure on the card the more positively will the roller be held in the notch.

Normally the card is not notched upon the edge opposite the beveled portion 38, but this edge is right-angled as indicated clearly in Figures 6 and 7. In Figure 5 the card on the edge opposite the beveled portion 38 is shown as notched at 40, a portion being cut out upon each manipulation of the key, as is hereinafter described. The card shown in Figure 5 has been inserted in five different units and a portion removed at each insertion. It is to be understood, however, that the card functions the same whether it is in its normal condition, that seen in Figures 6 and 7, or whether one or more portions have been removed, for, in each instance, there is a square shoulder movable into the notch 30 to engage the roller to prevent further insertion of the card, it being understood that while the card moves further into the guide portion 29 after each portion has been removed, the shoulder, either the end of the card in its normal condition or the shoulder 41 formed by the notching of the card, has the same position relative to the roller or notch. The arm 32 and its roller 31 serve an additional function, that of engaging the front edge of the card during all its manipulations, when properly inserted, and tending to keep it in such relative position that the printing upon the card will be at all times in proper alinement. Furthermore, this arm 32 and its roller serves to keep the cards, even though they vary in width, forced over toward the opposite side of the member 29, that is to the right in Figure 7, so that the cutting out or notching of the edge of the card will be properly accomplished at right angles and not at an incline thereto, and this prevents wedging of the card in the knife soon to be described.

From the foregoing it will be readily understood that the card cannot be inserted into the device far enough to perform any function unless presented in precisely the proper way. Neither can the mechanism soon to be described, that is the mechanism for printing, annunciating, ejecting a token, etc., be operated until the card has been properly presented and pushed in the requisite distance, because the insertion of the key is impossible until means guarding the key-hole have first been moved out of operative position by the card, as is further described. This key-hole guard and the mechanism by which it is controlled will be best understood upon reference to Figure 18 in which 42 is an arm fixedly mounted upon a rotatable shaft 43 extending transversely of the unit and arranged in the path of the card 37 as it is inserted. Fixed upon the same shaft 43 is an arm 44 normally held in its uppermost position by a light spring 45, the free end of the arm 44 having connected therewith one end of a link 46, the other end of which is connected with the end of an arm or guard member 47 pivotally mounted at 48 with its other end adapted to extend across the key-hole 19, as indicated by full lines in Figure 18. The full lines in Figure 18 indicate the normal position of the parts before the insertion of the card. As the card is inserted and pushed inward, pressure on the member 42 forces the same down into the dotted line position and at the same time the arm 44 is moved downward and, by reason of the pull on the link 46, the guard member 47 is moved into the dotted line position, thus moving it out of the path of the key inserted in the key-hole 19. This places the unit in condition for the insertion of the key by the employee or other person so that it may be turned to put into operation the printing, the announcing and the token-ejecting mechanisms etc., as is further described. It is to be understood that these parts are all held against operation until the key is inserted and turned, and that the key cannot be inserted until after the key-hole guard has been moved out of operative position by the insertion of the card.

The downward movement of the arm 42 is limited by a pin 49 removably held in place, and which serves an additional important function in connection with the cutting mechanism soon to be described. Upon removal of the key, the parts are automatically returned to their normal position ready for actuation by the insertion of another card, or of the same card if it is desired to repeat the order on this particular unit.

The cutting mechanism is shown best in detail in Figures 16 and 17. 50 is the stationary member of the cutting mechanism which is in the nature of shears, of which 51 is the movable member, pivotally mounted, as at 52, upon the stationary member and having pivotally connected to its lower end, as at 53, a link 54, the connection of the other end of which will soon be described. The member 50 has a plurality of openings 55, as seen in Figure 16, in which the pin 49 is removably inserted so as to be adjustable as to height, for a purpose soon to be described.

The member 51 adjacent its upper end is cut-away forming the recess 56 in which works loosely the arm 42 mounted on the shaft 43, as seen in Figures 16 and 17. The free end of the arm 51 is provided with the lateral projection 59 to prevent displacement of the arm 42 and to present sufficient material for the cutting operation. This portion 59 is movable beneath the projecting portion 60 of the stationary member 50, as seen in Figures 16 and 17, and cooperatively act together with an edge of the member 50, as shearing or cutting elements. The depth of the cut made in the card is governed by the extent of movement downward of the arm 42, which is regulated by the position of the pin 49 in one or the other of the openings 55 in the stationary member 50, as will be readily understood upon reference to Figure 16.

The width of the cut is governed by the extent of projection of the member 60 from the face of the stationary member 50, as will be evident upon reference to Figure 17.

The depending portion 29 of the chute or card-guide is provided in one of its side walls with an opening 61 through which, into the passageway through the guide, is designed to be projected the lateral finger 62 on an arm 63, see Figures 6, 7 and 9. This arm 63 is carried by the upper end of the swinging arm 64 mounted on a pivot 65 supported in the rear wall 66 of the unit, as seen clearly in Figures 9 and 12. 67 is a spring, under tension, secured to the arm 64 below its pivot, and to a stud or the like 68 projecting from the rear wall 66, as seen clearly in Figure 9. The lower end of the arm 64 has a lateral projection 69 over which engages a hooked member 70 pivotally mounted, as at 71, on a stud projecting from the rear wall 66, as seen best in Figure 9. Normally this hooked member is in engagement with the lateral member 69, as seen in Figure 12, so that the arm 63 and its finger 62 are in the position indicated in full lines in Figure 12, the latter out of the path of the inserted card. When this hooked member is removed from engagement with the projection 69, the spring 67 pulls the lower end of the arm 64 to the left in Figure 12 and the arm 63 is moved to the right, thus carrying the finger 62 thereof through the aperture 61 in the upper part of the member 29, so that the said finger traverses the passage through the card-guide and prevents the insertion of a card therein. This condition of affairs is brought about as follows. At the back of the unit are a plurality of tubes or containers 72, there being any desired number for each unit, in the present instance five being shown, and these are designed to contain a plurality of tokens or discs 73 of any suitable material, and each bearing some designating character associating it with the particular unit with which it is employed. The lower end of each tube or container 72 is open and has a portion thereof projected beyond the end of the base plate 24ᵃ, as seen clearly in Figures 9, 10 and 15, the outer wall, substantially half of the tube diameter having an opening 74 preferably of a depth slightly greater than the thickness of the token 73, as seen best in Figure 9, to permit of the ready passage of a token 73 when the same is acted upon by means now to be described. One of these tubes or containers is slotted, as seen at 75, and in said tube or container, resting upon the uppermost token 73 is a weight 76, as seen in Figures 9 and 14. This weight has lateral projections 77, see Figure 14. As the tokens are ejected, and when but few remain in the tube or container, these lugs or lateral projections 77, projecting through the slots 75, as seen in Figure 14, come in contact with the arms 78 fixed on a shaft 79, rotatably mounted in suitable standards or the like 80 rising from the base plate 24ª. 81 is an arm also fixed to the shaft 79 and extended beneath the hooked member 70, as seen in Figures 9, 12 and 14, and the downward movement of the weight serves to force the free end of the arm opposed to the hooked member 70 upward, and carrying with it said member 70 and thus releasing its hooked portion from the member 69. When the hooked member is thus freed of the projection 69, the spring 67 pulls the lower end of the arm 64 in the direction of the arrow seen in Figure 12, thus throwing the upper end of the arm 64 to the right as viewed in said Fig. 12, and projecting its finger 62 through the opening 61 in the portion 29 of the card-guide, thus to obstruct the passage through the card-guide.

The token-ejecting means is clearly illustrated in Figures 10, 12, 14 and 15, wherein 82 is a shaft extending transversely of the unit and mounted in suitable bearings 83 on the rear wall 66 of said unit and this shaft carries a plurality of ejecting arms 84, as many as there are token receptacles to the unit. These ejector arms are disposed at different angles with relation to the shaft so that instead of all operating together so as to eject a plurailty of tokens simultaneously, a token will be ejected from first one receptacle and then another, as the shaft 82 is intermittently and partially rotated as hereinafter described so that tokens will be ejected equally from the various receptacles. It is evident that one receptacle for each unit would suffice, but it is found advisable to employ a plurality so as to increase the capacity of the unit. Each ejector finger 84 is adapted during each full revolution of the shaft 82 to engage in a slot 85 of an ejector slide 86 mounted to slide in suitable guides 87 on the base plate 24ª, which guides may be of any suitable character. Each slide 86 is adapted to move beneath a token receptacle 72, as seen best in Figure 15, to engage and eject a token 73 which falls into a chute 88, as seen clearly in Figure 15, see also Figure 8, one chute serving for as many units as are arranged in vertical series, as seen in Figure 1, each chute 88 terminating at the front of the unit in a delivery cup 89 from which the ejected tokens may be collected by the operator of the units. This token constitutes an order which the operator delivers as a receipt for the commodity obtained by him from the server. As soon as a token has been ejected, the slide 86 is returned to its normal position by means of a spring 90 connected therewith, as seen in Figures 14 and 15, the other end being secured, as at 91, to the base plate 24ª, as will be readily understood upon reference to Figure 14. After a token has been ejected and the slide 86 returned to its normal position, the next lowermost token drops into position to be acted upon and engaged by the said slide as it is again moved forward against the tension of its spring, it being evident that the column of tokens are sustained by the slide 86 during this operation.

The shaft 82 is operated as follows:—When the key 22 is inserted in the key-hole 19 and given a partial turn to the right, Fig. 13, to operate the printing mechanism, it is turned back to the left and actuates mechanism, soon to be described, which serves to rotate the power shaft 92. Fast on this shaft 92 is the arm 93, seen clearly in Figure 13, which arm serves a double function. It has connected therewith one end of the link 94, the other end of which is connected, as at 95, with the arm 96 of a bell crank lever rotatably mounted at 96ª, the other arm 97 of which is pivotally connected, as at 98, with the yoke member 99, see Figure 10. This yoke member carries the rod 100 rendered adjustable in length as by the nut 101, and the other end of this rod 100 is pivotally connected, as at 102, with the member 103, see Figure 10. This member 103 is loosely mounted upon the shaft 82 and has pivotally mounted thereon, as at 104, a pawl 105, as seen in Figs. 10, 12 and 14, which cooperates with a ratchet 106 fast upon said shaft 82, the parts being so constructed and arranged that each time the arm 103 is moved in the direction of the arrow in Figure 10 the shaft 82 is revolved one-fifth of an entire revolution, in the present instance, because I have chosen to show five token receptacles 72. But, if there should be but three token receptacles, the parts would be accordingly proportioned so as to revolve the shaft 82 one-third of a full revolution upon each actuation of the member 103. The pawl 105 is held to its work by a spring 107, as shown in Figure 10.

Mounted upon a suitable lug or support 108 rising from the bed plate 24ª is a pawl 109 held to its work by a spring 110, as shown in Figure 10, the said pawl 109 cooperating with the ratchet 106, as shown, to prevent retrograde movement of said ratchet, when the pawl 105 is being returned to its initial position.

As seen clearly in Figure 13, the end of the arm 93 carries a pin 111 working in an elongated slot 112 in the vertically disposed arm 113 acted upon by a spring 114 under tension, as seen in Figure 13, the stop 113ª maintaining, when desired, the arm 113 in its initial position. The upper end of said arm 113 carries a laterally projecting pin 115 working in a slot 116 in a segment 117 loosely mounted on the shaft 118, and pivotally mounted, as at 119, upon the said segment is a spring-pressed pawl 120 cooperating with a ratchet 121 fast upon said shaft 118, as clearly seen in Figure 13, and having a detent pawl 121ª. This shaft 118 carries a spool 122 upon which is adapted to be wound the audit strip 123 which emerges from the base of the unit.

Mounted on the front plate 10, Figs. 11 and 14, is a counter mechanism 124. This counting mechanism may be of any well-known or approved form of construction, the numbered wheels 134 of which are visible through an opening 135 in the front wall 10 of the unit, as seen in Fig. 3, and operating to register the number of key manipulations and tokens ejected in a manner well-known in the art of counters. It will be understood that the register thus accumulates the number of portions ordered by the unit representing such commodity. On the shaft 82 is a star wheel 125, see Figures 12, 14 and 15, having teeth 126 equally spaced and corresponding in number to the number of token receptacles and ejector arms, in the present instance five, said star wheel being fast upon and rotatable with said shaft. 127 is a pin adapted for cooperation with the teeth 126 of said star wheel. This pin is carried by one arm of a bell crank lever 128 pivotally mounted, as at 129, on a suitable support 130 rising from the bed plate 24ª, and to the end of the other arm of this lever is pivotally connected, as at 131, a bar 132 which extends to and operates the lever 133 see also Fig. 11 which is the actuating lever of the counting mechanism. Attached to pin 131 is a spring 131ª, under tension, which acts to restore arm 128 to its initial position.

The power shaft 92 is designed to be revolved by manipulation of the key, as before mentioned. The actuation of the said power shaft 92 is caused by the return movement of the key, the initial movement of which first actuates the prime power shaft 136, see Figures 10 and 13, in the following manner. On this shaft 136 is a curved member, one arm 137 of which extends downward, as seen in Figure 13, the other arm 138 extending upward substantially vertically and carrying at its upper end a pin 139 from which depends the swinging member 140 provided with a plurality of teeth or the like 141, as seen in Figure 13, and having projecting laterally therefrom the pin 143 which is adapted to contact with the adjacent edge of the member 138, as seen in Figure 13. The member 141 has a tail portion 144, see Figure 13. The member 137—138 is bifurcated or composed of two parallel separated members, and between these members works the member 141 and its tail 144, as well as the arm 145 pivotally mounted, as at 146, on the end of the curved arm 147 fast upon the power shaft 92 which, for convenience, is herein termed the secondary power shaft. The arm 145 carries at its upper end a cam or pawl 148 mounted for pivotal movement upon a pin 149, 150 being a spring acting upon said cam or pawl. The free end of this cam or pawl is disposed in the path of the end of the tail piece 144 to be engaged by the latter, as will hereinafter appear. The arm 145 bears intermediate its ends upon a roller 151 carried by a stud 152, as seen clearly in Figure 13.

153 is a spring secured to the arm 93 between the pin 111 and the shaft 92, as seen in Figure 13, the other end of said spring being anchored, as at 154, to a suitable support 155 rising from the bed plate 24ª and which acts to restore and maintain, when desired, the shaft 92 and its connected parts in their initial position.

The initial turning of the key after being inserted in the key-hole is to actuate the printing devices, of which there are two in the present instance. The lower end of the arm 137 projects beneath a lateral pin or projection 156 on a pivoted member 157 fast upon the shaft 158, see Figures 11 and 13, and having projecting from the opposite side thereof a pin 159 contacting with the under face of the member 160 fast to the shaft 161, all as clearly seen in Figure 13. The members 157 and 160 are normally held in the position in which they are shown in Figure 13 by means of springs 162 and 163 connected at one end with the shafts 158 and 161 respectively, and at their other ends connected to the studs 164 and 165 the former having its opposed ends fast in the plate 10 and rear wall 66, and the latter fixed in said wall 66, see Figures 10, 11 and 13.

166, see Figs. 11 and 13, is a spring plate secured at its lower end to the shaft 158 and at its upper end carrying a movable platen 167 adapted for cooperation with the slug or printing character 168, it being understood that the platen carries the elastic surface 169, Fig. 12, for an obvious purpose. This platen prints on the card 38 of Figure 5 while it is inserted in the card slot 29.

170 is a spring arm or plate similar to the arm 166 just described, the lower end being connected to the shaft 161 and at its upper end carries a platen 171 designed for cooperation with the slug or printing character 172 similar to the slug or printing character 168 hereinbefore described and shown clearly in Figure 12, with the exception, of course, that the characters are designed to print different memoranda on the audit strip 123 from those printed on the card by the slugs 168. The members 166 and 170, see Fig. 13, are normally held out of operative relation to their printing position by means of the studs 173 and 174, respectively, whose opposed ends are fixed in the plate 10 and the rear wall 66, as seen in Figure 13.

The link 54, hereinbefore described as being connected at one end with the movable member 51 of the cutting mechanism, is pivotally connected, as at 175, with an arm 176 fast on the power shaft 92, as seen clearly in Figures 12 and 13, so that upon actuation of the power shaft 92 the said movable member 51 is actuated to cut the card.

177 and 178 are spools upon which are wound and unwound a carbon strip 179, as seen best in Figure 12. This carbon strip is guided by rods 180, 181, 183 and shaft 185, as seen in Figure 12. It is to be noted that the carbon strip is guided in such position as to be operated upon by both printing devices, the relative position of the carbon strip, the printing character and the platen being clearly shown in Figure 12 at the left in section, and in Figure 13 in elevation. The spool 177 is freely carried by the arms 182 and 184 respectively adjacent to the rear wall 66 and the plate 10, as seen in Figures 11, 12 and 13, the said arms being fixed upon the shaft 185, the construction being such that the spool 177 may be swung to the left, as seen in Fig. 13, so as to provide ready access thereto for renewing the carbon or other purposes. The shaft 186 of the spool 177 carries a gear 187, while the shaft 188 engaging the spool 178 carries a gear 189, as seen in Figures 10 and 12. The spools 177 and 178 are caused to move in one direction or the other by means of a gear 190, see Figure 12, which is carried by the arm 191 mounted on a shaft 192, the said arm being designed to be rocked upon its shaft in the following manner:—193 is an arm fast upon the secondary power shaft 92, as seen best in Figure 12; this arm is shown also in Figure 10 where it is shown as bifurcated or formed of two separated parallel members upon one of which is pivotally mounted, as at 194, the arm 195 which is pivotally connected at its other end, as at 196, with the arm 197 loosely mounted on the shaft 192, as seen in Figure 12, and carrying a pawl 198 pivotally mounted, as at 199, and acted upon by a spring 200. The pawl 198 engages a ratchet 201$^a$ fast upon the shaft 192 to rotate the same and by reason of the engagement of the gear 201 with the gear 190, the latter is intermittently rotated.

Loosely mounted upon the shaft 192 is a member 202 having arms 203 and 204, as seen clearly in Figure 12.

205 is a pin carried by the free end of the arm 193, as seen in Figure 12, which pin is adapted for cooperation with a notch 206 of an arm 207 freely mounted on a shaft 208, and with a hook 209 of an arm 210 also freely mounted on said shaft 208 and provided with an arm 211, the arm 210 being limited in its upward movement by a pin or the like 212, as shown. This, in connection with the members 213, 214 and 215, constitutes a reverse mechanism for the carbon strip, but forms no part of the present invention, it being understood that all of the parts mounted upon the shaft or support 192 have a rocking movement bodily, being moved in one direction by the engagement of the pin 205 in the notch 206 of the member 207, and in the opposite direction by engagement of the said pin 205 with the hook 209 of the member 210. A spring 216, seen in Figure 12, and connected with the upper end of the arm 191, serves to flop said arm in the required direction as soon as the latter passes the axial center, in one direction or the other.

217 is a spring acting upon the end of the spool 178 or its shaft to restrain the same and hold it in place.

218 is a spring connected at one end to the plate 10 and to a lug or the like 219 on the upper end of the member 138, as seen in Figure 13, tending to hold the same in its normal position, as will be readily understood.

220 is a member pivotally mounted on the stud 164 and having at its free end a hook 221, as seen clearly in Figure 12, adapted to engage over the shaft of the roll 177 to hold the same in its retracted position when desired for the purpose of renewing the carbon or permitting of access to the slug 168.

It now remains to describe the means for announcing to the cook or other party the order issued by the unit. For this purpose I provide an arm 222, as seen in Figure 12. This arm is fast on the secondary power shaft 92 and at its free end carries an insulated switch block 223 adapted for cooperation with the knife switch 224 mounted upon the base plate 24$^a$. 225 are the wires leading from said knife switch to an annunciator for the said unit, said annunciators being represented diagrammatically in Figure 2 by the reference numeral 226 and which may be of any well-known or approved form of construction, the details of which it is not deemed necessary to dwell upon.

227 is a spring, shown best in Figure 12, for holding the arms 182 and 184 in normal position.

228 is a key-hole at the base of the machine, as seen in Figure 3, for the insertion of a key to actuate the locking latch 229, see Fig. 12, to unlock the unit so that the same may be turned down into the position indicated by dotted lines in Figure 8 for access to the interior, when desired, such as re-loading the token receptacle or receptacles, or for other purposes.

The token receptacles are bodily removable as a whole, when desired.

The audit strip 123 protrudes down through an opening 230 in the base plate of the unit, as seen in Figures 10, 12 and 14, and as also will be readily understood upon reference to Figures 1 and 8. Each audit strip is wound upon a spool or the like 231, each mounted upon a spindle 232 and guided by suitable guides 233, as seen in Figures 1 and 8, the construction and arrangement being such that the said strips are delivered from the spools so as to be properly presented to the printing mechanism.

234, Figure 13, indicates a guide for the card or check and down which fall the pieces cut from the card by the cutting mechanism hereinbefore described, so that the portions cut out automatically drop out of the unit into the space below where they may be received in any suitable receptacle.

With the parts constructed and arranged substantially as hereinbefore described and as shown in the accompanying drawings, the operation, briefly stated, is as follows:—

Normally the parts are all locked so that the mechanisms of the unit cannot be operated. The waiter gets his order from the customer, and gets a card which he inserts in the opening of the appropriate unit. The key-hole is covered by the guard 47 and the printing mechanism, token ejector, the annunciator mechanism etc. cannot be operated until the key is inserted. The key cannot be inserted until after the guard 47 is moved out of operative position, which is done by the insertion of the card or check 37. Should the card be inserted improperly, for instance, upside-down or with the bevel 38 thereof at the wrong side, as indicated in Figure 6, further passage of the card is prevented by the roller 31, as shown in said Figure 6. But, if the card is properly presented, as indicated in Figure 7, the beveled edge 38 thereof forces the roller 31 outward, allowing the card to pass, as indicated in Figure 7. Further downward movement of the card or check brings it in contact with the member 42, as seen in Figure 16, the roller 31 bearing against the edge of the card and serving to keep it in proper vertical alinement and in position to properly receive the impression of the printing character. Further downward movement of the card 37 against the arm 42 serves to overcome the tension of the spring 45, as seen in Figure 18, causing the member 42 to assume the position shown in dotted lines in said figure, bringing the member 44, link 46 and guard 47 into the position indicated in dotted lines in said Figure 18, thus removing the obstruction to the introduction of the key. This downward movement of the arm 42 continues until it is stopped by engagement with the pin 49 in a predetermined hole 55 in the stationary member 50 of the shears. The card 37 is now in proper position to receive the impression. The key is now inserted and turned to the right, viewing Figure 13. This forward turning of the key, that is to the right, by the engagement of the lug 22ª with the teeth 141 of the depending member 140, serves to force the upper end of the arm 138 to the right, so that the lower end of the member 137 will exert a lifting force upon the pin 156 of the member 157 carried by the shaft 158, overcoming the tension of the spring 162 and, at the same time, by reason of the engagement of the pin 159 with the under face of the member 160 carried by the shaft 161, overcoming the tension of the spring 163, and then the spring members 166 and 170 by the partial revolution of the shafts 158 and 161 moved outward until the key passes the lower end of the member 140, when the members 166 and 170 fly back to their normal position in contact respectively with the stop rods 173 and 174 and in consequence of the whip-like action of the platen ends of the spring plates 166 and 170 the platens 167 and 171 cooperates with the printing characters 168 and 172 and the carbon sheet 179 interposed between both the card and the audit strip and printing characters, print such characters simultaneously upon the card 37 and upon the audit strip 123. This completes the operation of printing by both printing devices and completes the function resulting from the forward turning the key. It is to be understood that the card has imprinted thereon designations representing both the commodity and its price. For instance, as shown in Figure 5, the card was first introduced into a unit representing grapefruit, the price of which is fifty cents. The impression made upon the card represents the name and price of the commodity by the mechanism already described. The impression made upon the audit strip 123 will be the number of the machine, that is the commodity member, and the price of the commodity which it represents, and the number of the key, which identifies the operator or waiter. The character impressed upon both the card and the audit by the slugs 168 and 172 are predetermined and the unit provided with these means for printing the characters described. Obviously the unit can only so record until a substitution, and as the interior of the unit is accessible only to those who may be charged with the duty of prearranging the performances, the operator can make only such records as the unit is set to produce, excepting the recording of the particular key which is used as an actuator. It will be further understood that at the time of impression the key is in such an operative position as to impress the characters adjacent to those carried by the slug 172, the platen 171 causing this simultaneous printing.

After the key has been thus turned to the right and the impressions made, the parts actuated by such movement are automatically returned to normal position. The key in its initial movement is stopped at substantially a horizontal position and having passed the lower end of the member 140 has permitted the said member 140 under action of the spring 218 to assume a position to be acted upon by the lug 22ª of the key 22, when the key is rotated in the reverse direction or to the left in Figs. 3 and 13. Upon this reverse or return movement, a multiplicity of functions are performed. This pressure of the key upon the member 140 forces the member 140 to the left and upward, thus forcing the member 144 downward into engagement with the cam pawl 148, forcing the arm 145 downward and giving a partial rotation to the power shaft 92. Just prior to the time the key returns to a position where it can be withdrawn from the key-hole, the arm 144 snaps downward past the point of the cam 148, thus releasing the arm 145, allowing the said arm and the arm 147 to return to normal position, the shaft 92 revolving in a direction opposite to that in which it was revolved by the downward movement of said arm 145. The lower edge of the member 140 is still in engagement with the key. The pressure is not sufficient, however, to prevent withdrawal of the key. The key is then withdrawn when the spring 218 serves to return the arm 140 and its tail-piece 144 to their initial positions. The actuation of the shaft 92, through the connections hereinbefore described, causes the member 51 to be operated to cut a notch in the edge of the card 37. audit strip 123 is fed by the actuation of the member 113 through the medium of the arm 93. its pin 111 and the slot 112 in conjunction with the segment 117, pawl 120 and ratchet 122, as will be readily understood upon reference to Figure 13. Simultaneously therewith, the carbon feed is actuated through the medium of the arm 193, member 195 and the associated parts. As the carbon strip nears its end on either roll, the automatic reverse takes place through the medium of the arm 207, its notch 206, the pin 205 on the member 193, the arm 211 etc., all as clearly shown in Figure 12 and hereinbefore described. The partial revolution of the shaft 92 also forces the switch member 223 carried by the arm 222 into operative engagement with the knife switch 224, so that simultaneously with the cutting of the card, the feeding of the audit strip and the carbon feed, announcement is made upon the proper annunciator 226 at a distance, say in the kitchen, when used in connection with food control, to announce to the server that the party operating the unit has an order for the commodity represented by such unit. The token ejector mechanism and the counter mechanism are also operated simultaneously with the aforementioned devices through the connections hereinbefore described in connection with the said power shaft 92, and the machine has thus added another portion of the commodity to its accumulated record of the number of the commodity ordered and the operator or waiter has been given the order for this commodity on the server which also is to be both his payment for the delivery of such commodity and the server's recipt for dispensing.

Each time a card is inserted, no matter whether in the same unit in which it has been once inserted, or in a unit representing another commodity, a portion at the edge of the card is cut out so that the card may be inserted in the unit a sufficient distance to bring it in proper position to receive the next impression, in the desired sequential alignment. For instance, the card shown in Figure 5 has been inserted in five different units, the first unit representing "grapefruit", the next "minute steak". the next "French fry", the next "hot rolls" and the next "coffee". The portion of the card shown removed at the upper left-hand portion of the card designates five cuts, one upon each insertion. If the card is again inserted, another impression is made and another notch cut out.

It is evident that other forms of mechanisms may be employed for carrying out the various steps herein described so long as they are performed in the same order or for accomplishing the same result.

From all the foregoing it will be apparent that the check, or other evidence of the sale or other transaction, is first necessarily correctly imprinted or otherwise marked with the name and price of the commodity involved, this being done by inaccessible mechanism in an inaccessible position, thereby preventing tampering with, or manipulation of, the record. At the same time, a duplicate and checking record of the transaction is made which remains inaccessible to the selling agent or equivalent dispensing agent (in the present exemplary instance, the waiter).

Also the dispensing agent (such as the waiter referred to) is charged with the transaction in an inaccessible record, which record can be reached only by the proper accounting or other supervising authority. The order, or other transaction, is preliminarily announced to or recorded at the supply station (in the illustrative instance, with the chef in the kitchen).

The selling or dispensing station, as a part of the recordation of the transaction, is supplied with a commodity-identifying token, which is an authority for the delivery of the goods by the supplying station (here, the kitchen or chef) and also constitutes means for the supplying station to credit itself for surrendering the commodity.

The dispensing agent (e. g., the waiter), to secure the commodity demanding token which is necessary to secure the commodity involved in the transaction, is compelled to make a true record on the check (or other transaction sheet upon which the charge or collection is made) and also to make a duplicate record against himself which remains inaccessible except to the supervisory authority.

Likewise there is an inaccessible record made within the machine of the total sales of this particular commodity, and this total is instantly available for making up a sales sheet showing total sales of all different commodities. In a restaurant this would be the portion sheet and would obviate the laborious and time-consuming labor of segregating and collating this information from the guest checks or other bills of sale or corresponding records.

The system and its appurtenant records renders unnecessary the usual checkers and auditors also the attendant expense, and delay to commodity service and accounting, and also eliminates losses through collusion of waiters, checkers and auditors. The mechanism and method constitute a system of involuntary business control, that is, the transacters in order to secure and dispense commodities must necessarily and automatically make a true and complete and immediately available record of the transactions.

It will also be evident that while the system and the construction of the unit as hereinbefore explained is what I, at the present time, consider the preferable way of carrying out my invention, the same is subject to various changes and modifications in details of construction, proportion of parts and arrangement thereof, without departing from the spirit of the invention or sacrificing any of its advantages. I, therefore, do not intend to restrict myself to the construction, arrangement and proportions of parts as set forth herein, but reserve the right to make such changes, variations and modifications as come properly within the scope of the protection prayed.

What is claimed as new is:—

1. In the art of food control, the method which consists in positioning a card and then marking said card to form a record thereon, and, simultaneously therewith, marking upon a strip indicating characters, ejecting a token corresponding to the item marked on said card and announcing at a distance the order indicated by the marking on said card.

2. In the art of food control, the method which consists in positioning a card, marking upon said card the name and price of a commodity, and simultaneously marking upon an independent member other designating characters and making an announcement of such commodity.

3. In the art of food control, the method which consists in positioning a card and releasing means to simultaneously mark upon said card a food commodity and its price, and upon a separate memorandum other designating characters and announcing at a distance the said commodity as notice to prepare the same.

4. In the art of food control, the method which consists in positioning a card and releasing means to simultaneously mark upon said card a food commodity and its price, and upon a separate memorandum other designating characters and announcing at a distance the said commodity as notice to prepare the same, and at the same time ejecting a token designating said commodity.

5. The method of commodity control which includes the step of charging a person with the value of a commodity and thereby issuing to him a medium of exchange wherewith to obtain said commodity.

6. The method of commodity control which includes the step of charging a person with the value of a commodity and thereby simultaneously notifying a server to furnish said commodity, and issuing to said person a medium of exchange wherewith to obtain said commodity from said server.

7. The method of food control which includes causing a waiter necessarily to charge himself with the value of a food commodity in order to obtain a medium of exchange wherewith to secure said commodity.

8. The method of food control which includes causing a waiter necessarily to charge himself with the value of a food commodity in order to obtain a medium of exchange wherewith to secure said commodity and thereby notifying a server to furnish said commodity.

9. The method of food control which includes the simultaneous steps of printing the name and price of a commodity, notifying a person to furnish said commodity and supplying a commodity-identifying medium of exchange.

10. The method of commodity control which includes the step of charging a person with the value of a commodity and by such charging notifying a server to furnish said commodity.

In testimony whereof I affix my signature.

H. RUSSELL BRAND.